Feb. 5, 1924.

A. AMES, JR 1,482,503

PHOTOGRAPHIC LENS SYSTEM

Original Filed Jan. 12, 1920   3 Sheets—Sheet 1

Inventor:
Adelbert Ames Jr.
by Roberts Roberts Cushman
his attys.

Feb. 5, 1924.

A. AMES, JR 1,482,503

PHOTOGRAPHIC LENS SYSTEM

Original Filed Jan. 12, 1920    8 Sheets-Sheet 2

Inventor:
Adelbert Ames Jr.
by Roberts Roberts Cushman
his Attys.

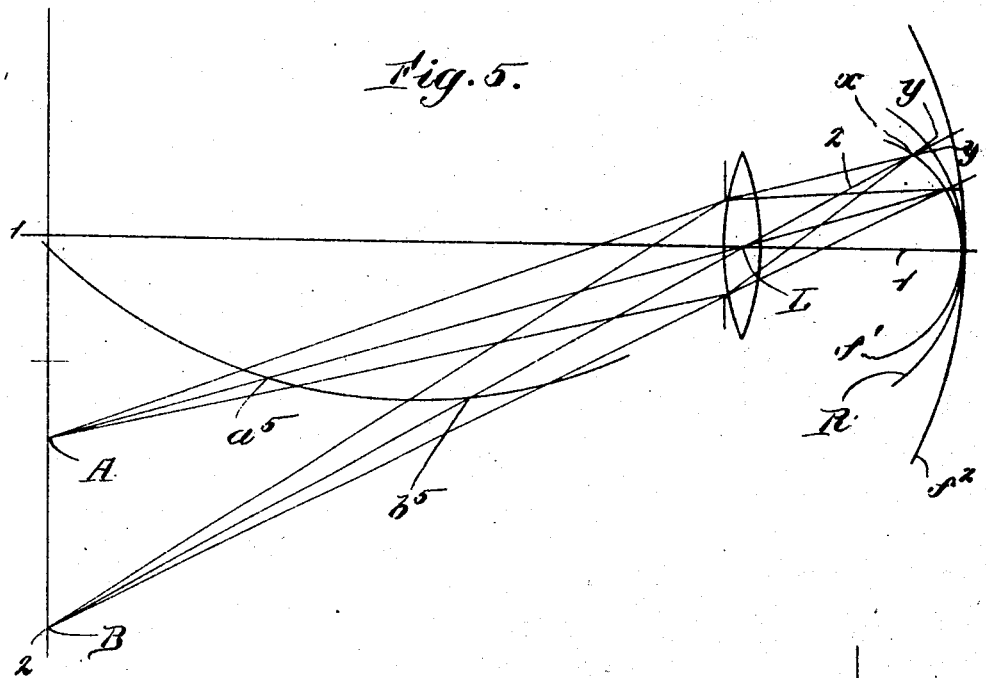
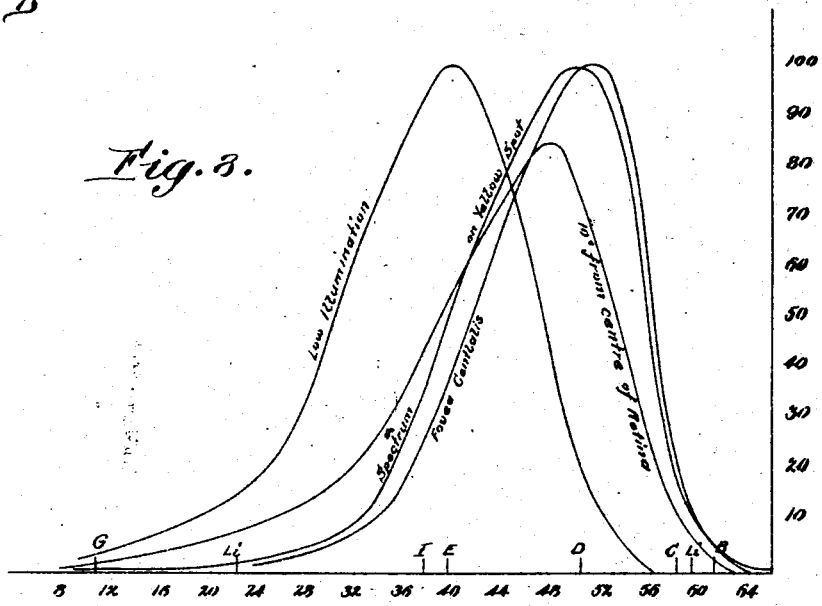

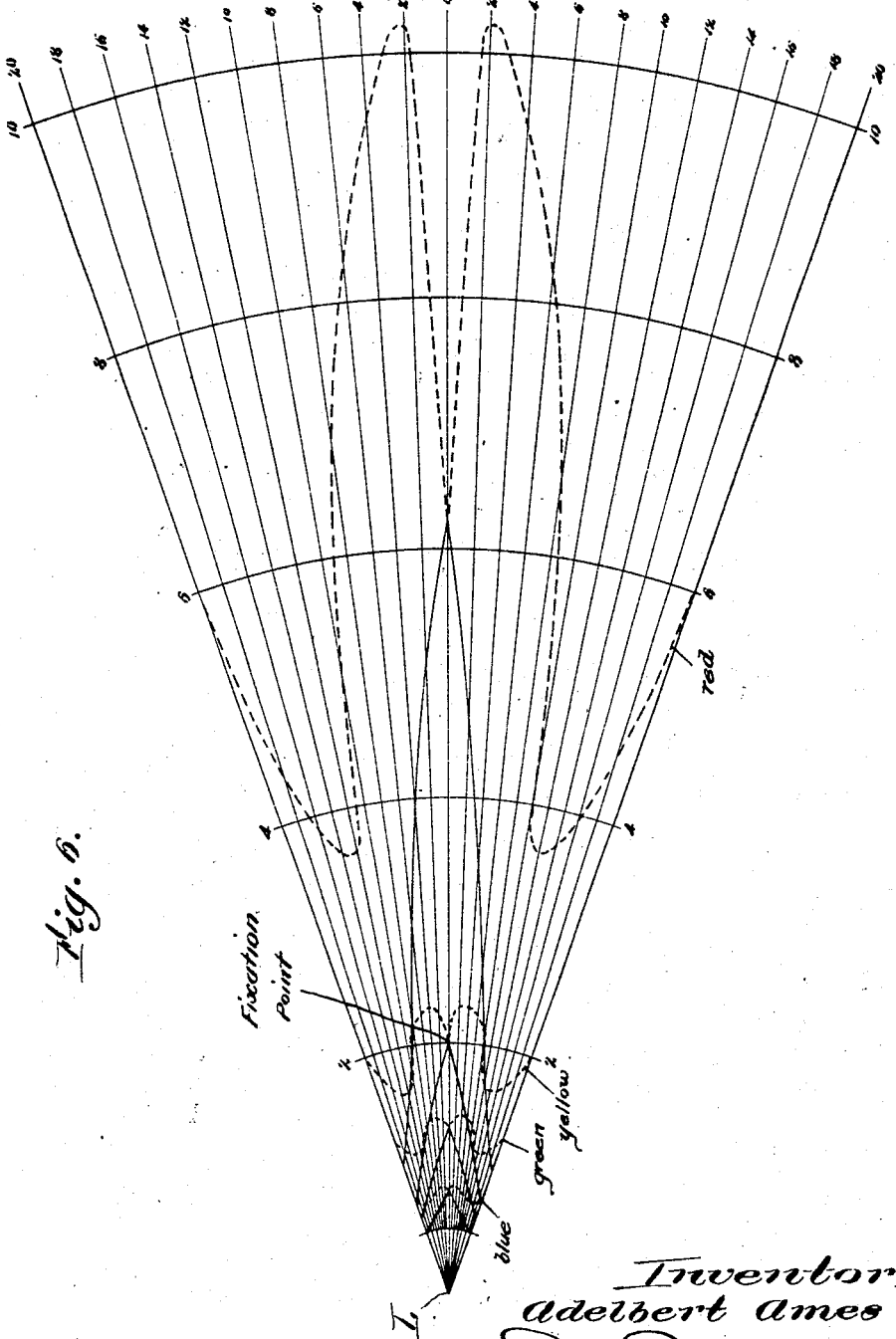

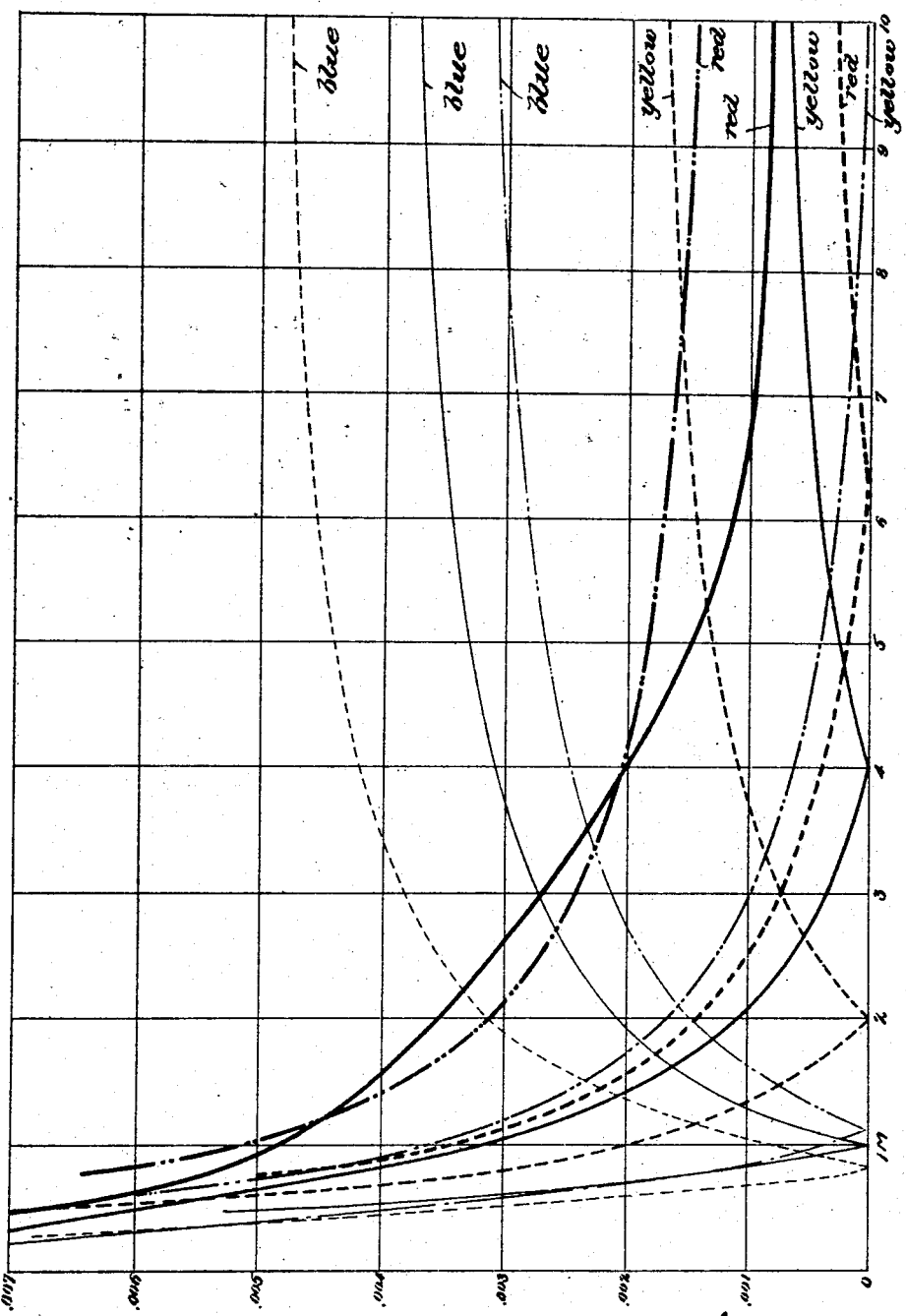

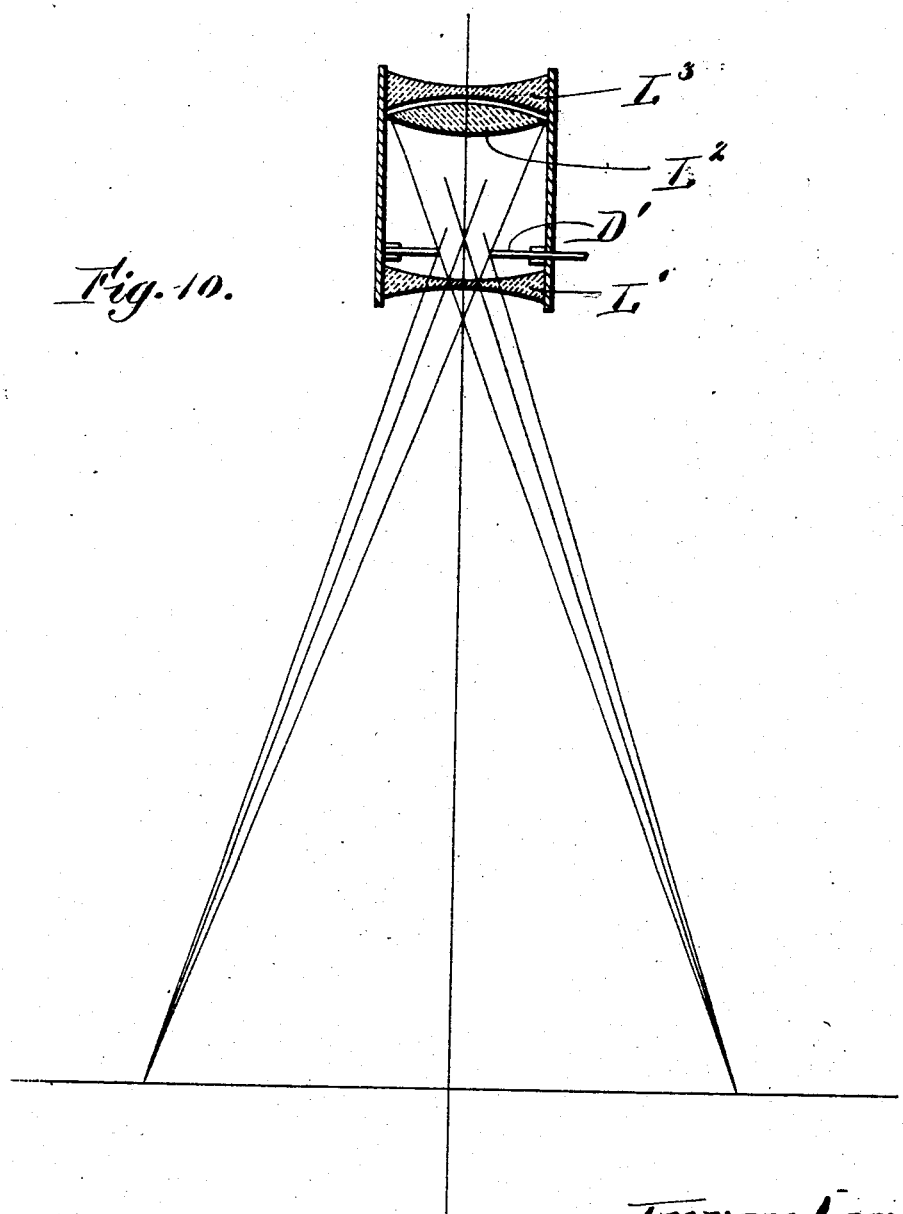

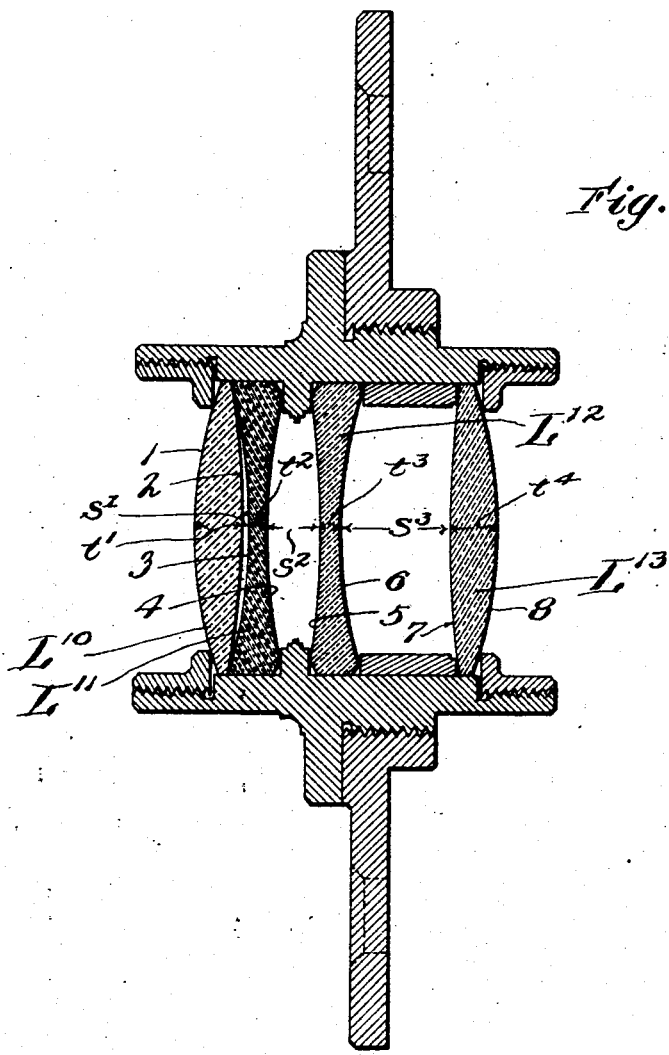

Feb. 5, 1924.　　　　　　　　　　　　　　　　　　1,482,503
A. AMES, JR
PHOTOGRAPHIC LENS SYSTEM
Original Filed Jan. 12, 1920　　8 Sheets-Sheet 8

Inventor:
Adelbert Ames Jr.
by [signature]
his Attys.

Patented Feb. 5, 1924.

1,482,503

UNITED STATES PATENT OFFICE.

ADELBERT AMES, JR., OF HANOVER, NEW HAMPSHIRE.

PHOTOGRAPHIC-LENS SYSTEM.

Original application filed January 12, 1920, Serial No. 351,011. Divided and this application filed June 2, 1921. Serial No. 474,561.

*To all whom it may concern:*

Be it known that I, ADELBERT AMES, Jr., a citizen of the United States of America, and resident of Hanover, in the county of Grafton and State of New Hampshire, have invented new and useful Improvements in Photographic-Lens Systems, of which the following is a specification.

This invention relates to a lens system adapted to form images for photography.

Photography as heretofore carried out, in a pictorial sense, has aimed to present to perception a record of the natural thing portrayed recognizable, with more or less aid by the imagination, as a reproduction of the object depicted.

At best, pictures formed by photography or otherwise are limited to a partial presentation only of the factors or qualities giving distinguishing appearance to natural objects as viewed by the human eye. For natural objects exist in tridimensional space, while a picture must be viewed as a plane projection, either as thrown upon a screen, as a transparency seen against an illuminated background, or as an arrangement of light and dark places on a paper or other surface. The complete illusion of looking at the object pictured is not and probably can not be reached by photographic or other means because of the artificiality of the picture due to these reasons. Absence of color is, of course, also a factor in failure of illusion, but not the most important factor.

Apart from these inherent qualities of any picture, photography as heretofore practiced has also failed of illusion in more subtle qualities, to the remedy of which the present invention is addressed. The makers of lenses have sought mathematically exact definition, absence of distortion and correction of diffusion at all parts of the field represented by the photographic picture, so that the average photographic picture contains a too-faithful record of the detailed outline and light and shadow in every portion of the whole angular field of view represented by the print or screen image constituting the picture.

Persons skilled in the graphic arts and competent critics of artistic effort have long realized the illusive and esthetic limitations of pictures of this nature, of which the faults in general may be summed up as lack of concentration of attention at the center of interest, lack attainable illusion of depth, lack of illusion of the appearance of objects away from the center of interest, lack of aerial or monocular perspective and lack of color (except in polychromatic photographs, in which falsity of color is also characteristic).

With respect to color photographs as heretofore known faults of the same nature have been apparent to those skilled in the graphic arts; lack of concentration, lack of illusion of perspective, and particularly a general inaccuracy of edge and crudity of color value have characterized the best of such pictures.

These difficulties in the prior art photographs (and in other pictures) may be broadly characterized as comprising typically a tendency to over-accurate definition, resulting in essential falsity of the reproduction in respect to the image of the real object as perceived by the observer, and hence being disappointing to the eye expecting to find in the picture those aberrations natural to the eye, and without which the reproduction must seem patently artificial, although the observer may be unable to analyze the source of the wrong appearance.

I have discovered by research, and shall hereinafter mention, certain relatively large distortions, diffusions and aberrations of the natural ocular appearances of nature which are absent from any photograph heretofore made, so far as I am aware, although I am aware of certain photographs deliberately made with lack of optical definition, or so treated as to be indefinite and fuzzy. Certain approximations of the distortions, diffusions and aberrations of the human eye have been attained in works of art by good painters, but even in this case they have been attained haphazard by the intuitive perceptions of graphic genius; the necessity and reason for imitating these appearances in the graphic arts has not been formulated. In the handiwork of painters the occasional simulation of these distortions, diffusions and aberrations, therefore, has not been systematic or consciously reached, and has not been consistently and correctly attained with scientific accuracy. I am not aware that the nature, distribution and extent of the distortions, diffusions and aberrations proper to a photograph or other graphic representation have ever previously been determined, or ever proposed to be embodied in the picture.

Principal objects of the present invention are to provide a photographic lens system for use in forming an image which shall give a subjective impression or illusion to the observer similar to the impression given by the image received on the retina of the human eye in respect to the distortions, diffusions and aberrations of its various parts, whether the photograph is monochromatic or polychromatic. It will be understood that in the case of monochromatic photographs, the chromatic aberrations of the eye are also accounted for and translated into their monochromatic equivalents in order completely to obtain the character of illusion referred to in this specification.

I shall hereinafter find it necessary to describe some of the qualities of the images actually perceived of natural objects as an aid to description of the photographic lens of this invention.

The bases of human visual imagery upon which the associative and artistic value of the pictorial arts are founded are the mental visual images which are stored up in the human mind. The nature of such images is based on the character and form of the images received on the retina of the normal human eye. The nature of these retinal images in turn is determined by our ordinary habits of vision. In looking at a scene, we focus on some particular part of it due to its special interest or beauty. We hold that focus a moment or two, and then look at another center of interest, or look away entirely. With each fixation of the eye a retinal image is formed which makes a mental impression of the same nature. Our mental visual images consist of a series of such impressions. To recall these mental impressions for associative or artistic reasons, a similar impression must be presented to our consciousness. This can be done only by presenting a picture with the characteristics of a retinal impression, i. e., having a center of focus well defined, and having all other parts more or less diffused to extents and in directions simulating the ocular appearance of the object. When such a picture is looked at the fovea or clear-seeing part of the eye passes over it and recognizes its various parts with their characteristic diffusion and distortion as being similar to different parts of the mental visual image. It does this in the same way that the attention or mind's eye passes over various parts of a mental visual image, and it recognizes the picture as being similar to a subjective impression.

The mind never receives mental images of the nature of a corrected photograph by visual perception of natural objects. Such an impression could only be given to the mind if the retina perceived wholesale, and were not, as in fact, almost blind to detail except as imaged on the fovea.

This invention provides a method or art of forming and a photographic lens system for practicing the method by making an image avoiding a false clarity of reproduction of the object and having distortions, aberrations and diffusions approximating those characteristics of the sensory impression of the retinal image perceived by the normal eye, and includes a photograph resulting from practice of the method.

In the accompanying drawings,—

Figure 5 is a diagram illustrating the tangential and radial astigmatic aberration of the eye;

Figure 6 is a diagram of the object field of the eye illustrating the loci of points having like astigmatic foci respectively for light of several colors;

Figure 8 is a diagram illustrating the variable sensitivity of different regions of the retina to light of different colors;

Figure 9 is a diagram illustrating the dimensions of the chromatic circles of diffusion for different fixations of the eye and different colors;

Figure 10 is a sectional diagram of one type of lens corresponding to the invention;

Figure 11 is a similar diagram of another species of lens corresponding to the invention.

In order to explain the characteristics of the lens system herein described, comparison with the characteristics of the human eye as an optical instrument will aid understanding. The new system approximates the optics of the eye in: I, resolving power; II, the nature of its out-of-focus images; III, chromatic aberration; IV, radial and tangential astigmatism; V, linear distortion.

I. The resolving power of the eye is limited not only by the aperture and the spherical and chromatic aberrations of the lens, as varied by the size of the pupillary opening, but also in effect is controlled by the sensory incapacity of the retina to perceive separate stimuli nearer together than the position of every second sensory cone. Separation of objects one minute of arc apart is the normal limit.

The eye is a smaller instrument than the usual practicable photographic apparatus, having an average focal length of 17 mm. Photographic lens systems are seldom shorter than 50 mm. in focal length, and characteristics of the new lens system are hereinafter explained upon a basis of a minimum focal length of 50 mm.

The high light-gathering or illuminating power of the eye need not be preserved at the cost of difficult curvatures for glass or of inconveniently short-focus lens elements. The absolute size of diaphragm should preferably be kept the same as the pupillary opening. Pupillary openings vary normally from 2 to 6 mm.; the ratio of aperture to focal length of the normal eye thus varies from $f/2.7$ at low illumination to $f/8.5$ in bright light; the lens system may have a similar diaphragm and variable ratios of aperture to focal length between $f/8.3$ and $f/25$ with convenience. At maximum, the theoretical resolving power need not exceed that of the eye. The characteristic qualities of the new lens system are best attained in practice by lenses of relatively short focus.

Figure 4:
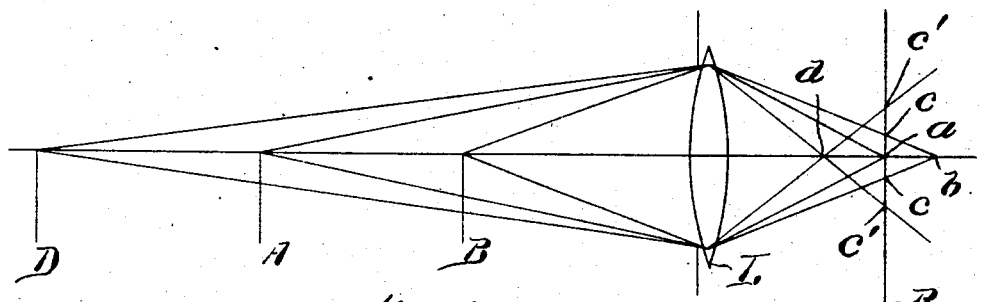
Figure 4 is a diagram illustrating another source of perception of depth of field.

II. Referring now to Fig. 4, the image formed by the eye lens L on the nearly spherical retinal surface R, considering rays of any one color from objects nearly in the direct line of sight, at any fixation of focus will comprise a definite image $a$ of a point in object A at the fixation distance. Every other object point D further away from the eye will have an image $d$ in front of the retina, and every point of object B nearer than A will have an image $b$ behind the retina, and in either case the out-of-focus light on the retina will be represented by a circle $c'$, $c'$ wider than the image $a$. The size of these circles depends on the ratio of pupillary aperture of focal length, and their perception is important to monocular perception of distance. These out-of-focus point images are circular only when in the line of sight.

The image $a$ of point A is not, however, a point. The eye lens, approximately of spherical surfaces in the normal eye, has the spherical aberration of all such simple lenses, so that some of the light from B is focused in front and some behind the retina, the best focus being a concentrated part of the bundle. We may, however, disregard spherical aberration so long as it is within the resolving power capable of separating objects about 1 minute of arc apart.

Figure 1:
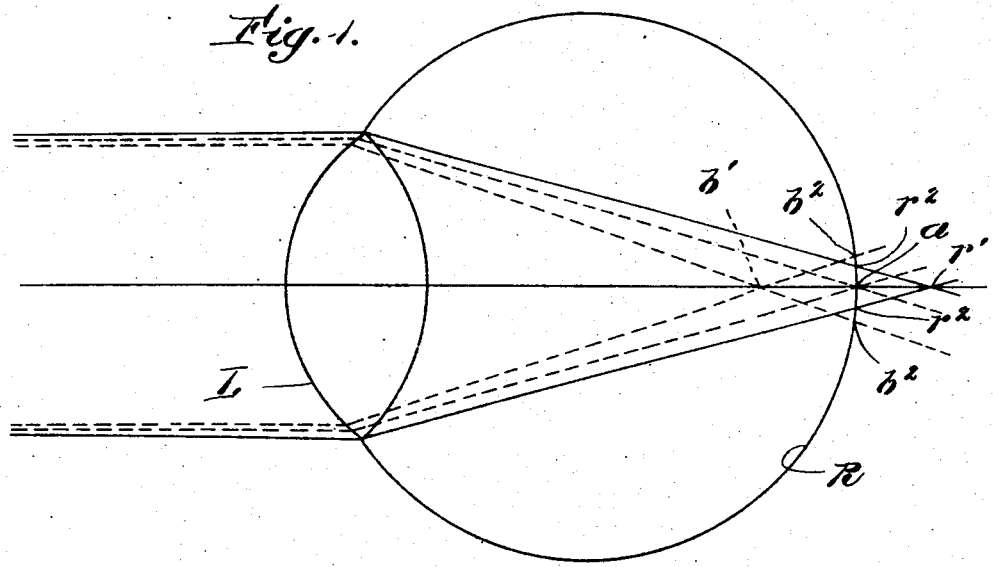
Figure 1 is a diagram of the human eye illustrating certain of the aberrations of its lens system.

III. Chromatic aberration is more important. Referring to Fig. 1, a perfect image of a white light at $a$ can not exist on the retina simultaneously of all of the components of that light. If fixation is upon the brightest component of the white light, in the yellow part of the spectrum, the red light will be focused at $r'$ and the blue light at $b'$. The image will thus consist of a clearly defined yellow point $a$, a circle $r^2$, $r^2$, of blue and red light out of focus, and an overlapping ring $b^2$, $b^2$, of the more refrangible blue. Since diffusion is at the cost of intrinsic brightness, the purple and blue halo about the bright point $a$ will be more salient when the background is dark.

Figure 2:
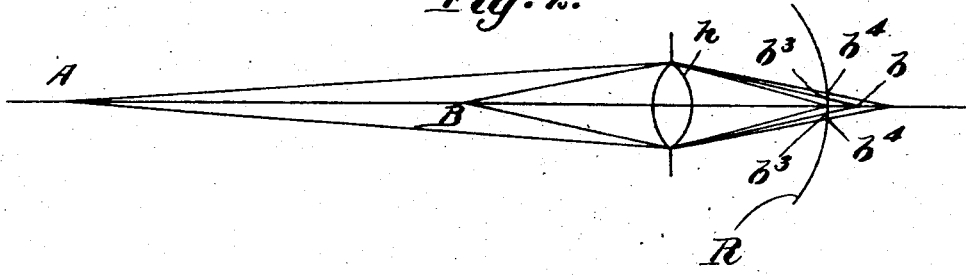
Figure 2 is a diagram illustrating one source of monocular perception of axial depth of field.

Referring now to Fig. 2, the bright image on the retinal surface R of the point A whatever the color of the light emanating from A will have a characteristic chromatic halo $b^3$, $b^3$, whereas the bright image of a nearer point B will have a different characteristic chromatic halo $b^4$, $b^4$. It will be observed from this fact that the chromatic aberration of the eye aids in the monocular sense of distance; since the eye perceives the characteristic chromatic aberration peculiar to the distance of the object whose image bears it, and relies on the appearance for the perceptive estimate of the distance.

It need not be explained that the peculiarities of chromatic aberration follow the images of objects placed out of the line of sight or optical axis of the eye; the color distribution of the halo or fringes surrounding bright points may be shown in a manner similar to that mentioned above to definitely establish the distance of the object in its relation to the eye. We therefore expect to see a certain color fringe or halo characteristically placed with respect to the objects in and away from the line of sight depending in amount and form upon their distance, their departure from the axis of the eye, and upon the accommodation of the eye.

Figure 3:
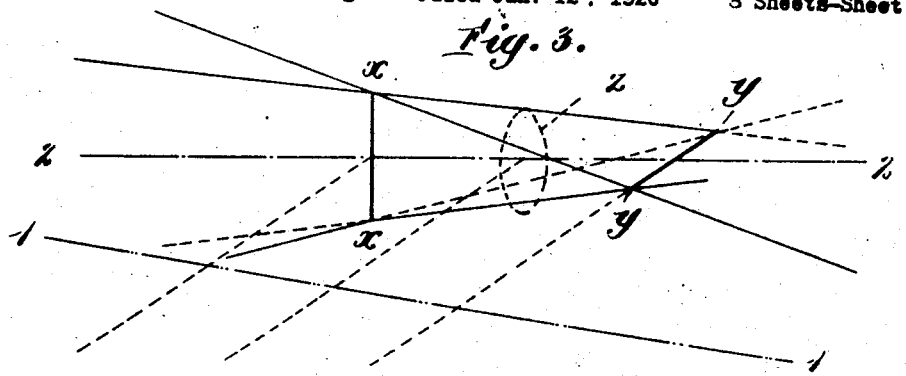
Figure 3 is a diagram in perspective illustrating tangential and radial astigmatic aberration.

IV. Considering again the case of monochromatic vision, the nature of the image in the human eye is modified by radial and tangential astigmatism. Referring to Figs. 3 and 5, let us suppose the line 1—1 to be the optical axis, and the line 2—2 to be the central ray through the center of the lens from the point B, Fig. 5 displaced from the axis 1—1 by a substantial angle.

All of the light from the point B will pass through no single point in the line 2. The oblique passage of the bundle of rays through the lens L results in the concentration of the image in two regions, the first in a substantially tangential line with respect to a circle central on the axis 1, and the second in a substantially radial line with respect to the axis 1. The mean between these regions of first or tangential astigmatic focus and the second or radial astigmatic focus is a region of least astigmatic confusion, at which the bundle of rays is substantially circular, but not a true image of the point B. As illustrated in Fig. 3, the first or tangential astigmatic focus is shown at $x$, $x$, the second or radial astigmatic focus is shown at $y$, $y$, and the circle of least confusion at $z$. The optical conditions in the eye are such that the retinal surface R throughout its greater portions occupies a position between the first and second astigmatic foci $f'$, $f^2$ of equidistant objects.

For every fixation of the eye with respect to a definite object in the field of view some different part of the astigmatically illuminated image region $x$, $x$, $y$, $y$, Fig. 3, of the object will be projected upon the retina, and there will be different diffusion of edge or point depending upon whether this intersection of the retina with the astigmatic region is nearer the tangential focus $x$, $x$, or nearer the radial focus $y$, $y$.

Referring to Fig. 5, let us assume the case of an object $b^5$ in the direction of the point B and an object $a^5$ lying in the direction of a point A and at a lesser angle to the axis 1, 1. Points exist on the lines L, A, and on the lines L, B, wherein the objects $b^5$ and $a^5$ respectively produce upon the retina a tangential astigmatic focus, and other places exist along these same lines L, A, and L, B, at which other objects produce upon the retina radial astigmatic foci.

For every fixation of the eye at a given focus then, there will exist two regions in the object field in which every source of light is imaged as a tangentially astigmatic or a radially astigmatic image, respectively, objects between these spaces in the object field being projected upon the retina in ellipsoidal forms having their greatest elongation tangentially or radially arranged as the image of the object is nearer to the tangential or radial astigmatic focus.

For any given fixation of the eye, focus of the tangential astigmatic image on the retina is possible for light of one color proceeding from an object occupying any place in a certain fixed surface in space.

Focus on the retina of the radial astigmatic images corresponds to another focus in space of objects capable in that fixation of the eye of forming such images.

For every different color of light, the positions of the objects forming astigmatic foci respectively tangential and radial will be different. For any fixation of the eye, then, we may discover in space a particular surface upon which all objects will form their respective astigmatic images in a particular color. This will be plain from Fig. 8, which plots the focus of these object surfaces for a normal eye fixed at two meters focus respectively for the radial and the tangential astigmatic foci of typical red, yellow and blue wave-lengths.

I attribute a greater part of the monocular perception of distance of objects off the axis to the perception of the direction and extent of the astigmatic diffusion resulting from the optical considerations mentioned above.

Figure 7:
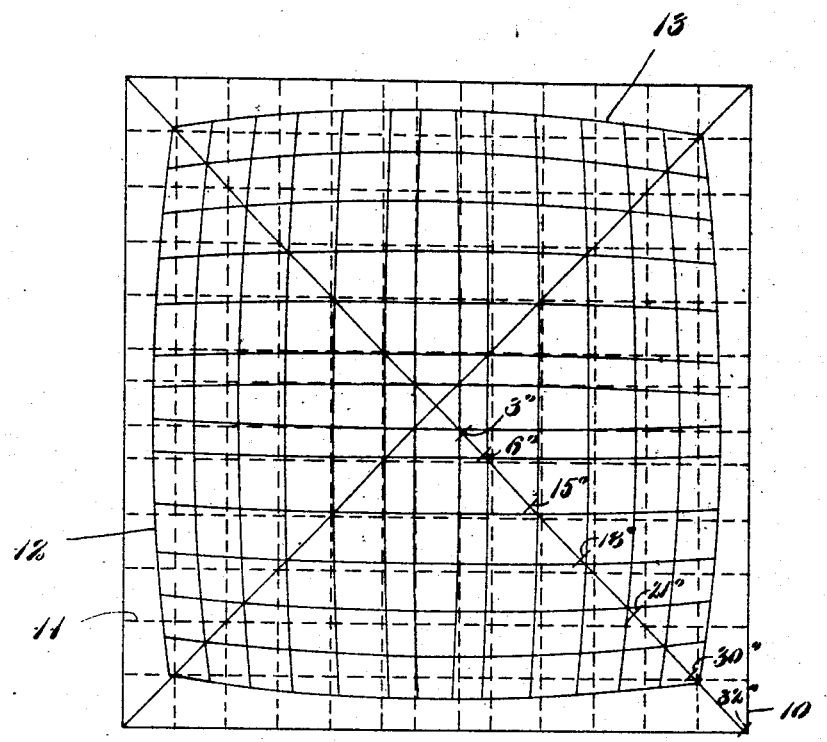
Figure 7 is a diagram illustrating the geometric, linear or barrel distortion of the image of a rectangular object on the retina.

V. The optical mechanics of the eye also produce a well-understood optical and a larger geometrical distortion of the image now referred to with the aid of the explanatory diagram in Fig. 7. The retina is a segment of a sphere, with respect to which the eye lens is not central, and the projection of vertical and horizontal lines upon this surface at angles from the central axis are curved intercepts of planes with this sphere. Comparing the image on the retina with the natural appearance, the rectangular grid having verticals 10 and longitudinals 11, Fig. 7, produces an image having a vertical curve 12 and a horizontal curve 13, respectively.

The clear-seeing region (fovea centralis) is of the order of one degree of angular magnitude only, and is surrounded by the "yellow spot," so-called, extending about six degrees on the horizontal median line and about four degrees on the vertical meridian of the eye. The sensitivity of the retina outside of these regions has marked peculiarities; we therefore have to deal, when considering the appearance of natural objects as really perceived, not only with the optical distortions due to the lens system of the eye but with the perceptory peculiarities due to the mechanism stimulated by the optical image.

The sensitivity of the different regions of the retinal surface to differences of color is different. Referring to Fig. 8, the ordinates of the diagram indicate wave lengths of light and the abscissæ percentages of sensitivity of the different regions for the normal eye. The fovea centralis is most sensitive to the region of spectrum lying immediately below the bright yellow D line. The sensitivity of the yellow spot is slightly greater for short wave lengths; and the sensitivity of the region within 10° from the optical center is less acute for bright yellows, reds and greens and more acute for blues and violets. The trace marked "Low Illumination" illustrates the distributions with respect to color of the maxima and minima of perception when under low illumination.

The quantitative size of some of the aberrations and diffusions mentioned above will be plain from the diagram Fig. 9, which plots for a fixation at a distance of two meters, the angular size in radians of the circles of diffusion for light of different colors emanating from points placed at the respective distances indicated by the scale of ordinates. The apparent size of such circles of diffusion for any color at the distances shown is a product of its angular diameter in radians shown on the scale at the left by its distance from the eye. These quantities are relatively large.

In order to produce pictures having the characteristics of a retinal image the aberrations, diffusions and distortions mentioned above must not only be present in the picture but they must be present in the proper relative amounts. For instance, pupillary opening, focal length, chromatic aberration, astigmatism, and retinal sensitivity each contributes to the nature of colored edges; proper portrayal of these edges can be arrived at only by providing these characteristics in the same proportions and directions.

I regard it as particularly important that the lens system produce tangential and radial astigmatic images related to the sensitive plate in substantially the same manner and to substantially the same degree as those of the eye are related to the retina.

A photographic lens system is essentially a fixture so far as the curvature of its optical surfaces is concerned, as compared with the free changeability of the eye. For this reason it is necessary either to provide a lens system for the approximation of the appearances of every fixation of the eye, or to select a typical fixation, such as infinity, with respect to which the lens is calculated; the latter course is preferred.

One type of lens is shown in Fig. 10, consisting in its simplest form of two negative glass components $L'$, $L^3$, and one positive glass component $L^2$, respectively separated by air spaces and responding to the characteristics pointed out below. Such a lens also includes a changeable or variable diaphragm $D'$ corresponding to the pupillary opening. The lens $L'$ is a negative lens of low dispersion glass. The lens $L^2$ is a positive lens of high dispersion glass. The len $L^3$ is a negative lens of low dispersion glass.

The relative radii of the surfaces and the particular constants of their curvature naturally depend upon the particular glasses selected of the many types of high and low dispersion glasses available, upon the consequent relationships of the thickness of the component lenses, of the air-spaces between them, and the longitudinal position of the diaphragm, which may be suitably varied to permit the employment of different types of glass. Whatever particular detail of these factors may be selected, the preferred relationship of diaphragm to diffractive elements is such as to contribute to the increase and decrease of the uncorrected aberrations due to the lenses by increase and decrease of the diaphragm aperture, in the same manner as change of pupillary opening increases and decreases the corresponding aberrations of the eye. A particular lens corresponding to the invention may have the following constants, which for further understanding are tabulated parallel with and for comparison with the similar constants of a normal average eye:

1. *Focal length and aperture.*

| Eye. | Lens. |
| --- | --- |
| Focal length, 17.053 mm. (about) | Focal length, 50 mm. |
| Pupillary opening: | Diaphragm opening: |
| Bright illumination 2 mm.=f/8.5 | 2 mm.=f/25. |
| Medium illumination 4 mm.=f/4.2 | 4 mm.=f/12. |
| Low illumination 6 mm.=f/2.7 | 6 mm.=f/3.3. |

2. *Chromatic aberrations.*

Surfaces are figured to cause chromatic aberrations as in the following table:

| Color. | Refractive differences from image plane. | |
| --- | --- | --- |
| | Eye. | Lens. |
| C (λ 6563) | +.082 | +0.706 mm. |
| D (λ 5893) | .000 | 0.000 |
| Green (λ 5462) | −.065 | −.559 |
| F (λ 4861) | −.173 | −1.490 |

Figure 12:
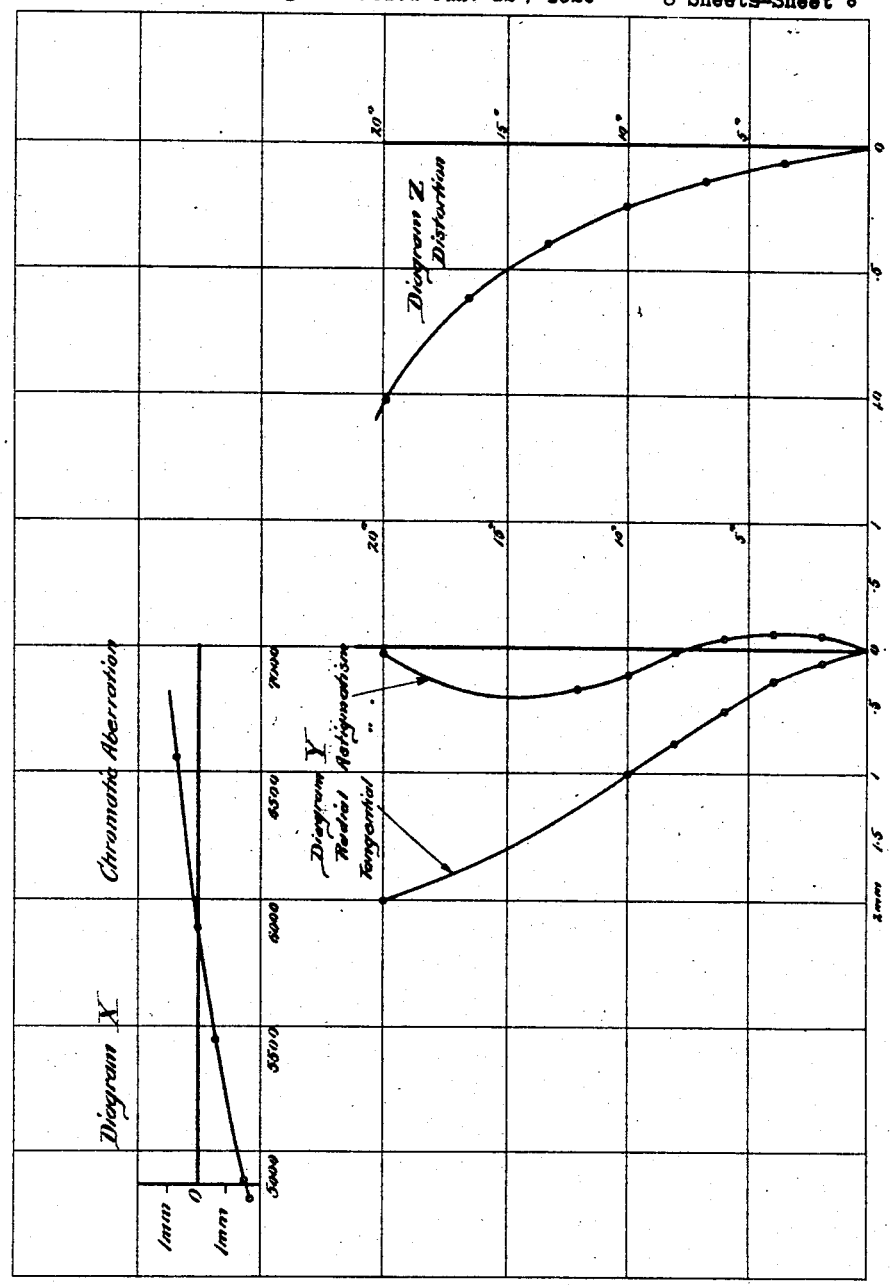
Figure 12 is a series of diagrams plotting graphically certain constants of an instance of such a lens.

These quantities are shown graphically at X, Fig. 12.

3. *Radial and tangential astigmatism.*

The lens system as a whole is undercorrected for radial and tangential astigmatism according to the following table:

| Angular departure from axis. | Locus of tangential image in respect to image plane (1st astigmatic surface). | |
| --- | --- | --- |
| | Eye. | Lens. |
| 0° | 0.000 mm. | 0.000 mm. |
| 2° | .022 | 0.110 |
| 4° | .046 | 0.230 |
| 6° | .095 | 0.475 |
| 8° | .148 | 0.740 |
| 10° | .199 | 0.995 |
| 12° | .251 | 1.225 |
| 20° | .402 | 2.010 |

| Angular departure from axis. | Locus of radial image in respect to image plane (2d astigmatic surface). | |
| --- | --- | --- |
| | Eye. | Lens. |
| 0° | 0.000 mm. | 0.000 mm. |
| 2° | −.023 | −0.115 |
| 4° | −.026 | −0.130 |
| 6° | −.019 | −0.095 |
| 8° | .000 | .000 |
| 10° | +.039 | +0.195 |
| 12° | +.064 | +0.320 |
| 20° | +.009 | +0.045 |

Referring to Fig. 12, the error of the lens system with respect to astigmatism is plotted at diagram Y, in which the ordinates are displacements of the astigmatic images and the abscissæ degrees of angular departure from the optical axis.

4. *Spherical aberration.*

The system may be corrected with reference to the sodium D line.

5. *Coma.*

The system may be corrected for coma.

6. *Distortion.*

The lens system is figured refractively to cause barrel distortion producing a curved image of parallel lines having the following characteristics in each dimension:

| At angle from axis of— | Max. linear distortion. | |
|---|---|---|
| | Eye. | Lens. |
| 3° 20′ | .0245 mm. | 0.0735 mm. |
| 6° 48′ | .0502 | 0.1506 |
| 9° 58′ | .0802 | 0.2406 |
| 13° 16′ | .1256 | 0.3768 |
| 16° 33′ | .2068 | 0.6201 |
| 19° 53′ | .3421 | 1.0260 |

It will be understood without further description that the lens system shown in Fig. 10 refractively causes the diffusions, aberrations and distortions mentioned above as a consequence of refraining from introducing any of the ordinary corrections for these aberrations, diffusions and distortions and as a further consequence of figuring the respective surfaces and controlling the respective distances and thicknesses of the elements, dependent upon their index of refraction, to secure the astigmatic and other aberrations and distortions as mentioned in detail above, and that the precise curvatures of the respective elements of the lens are a function of the selected focal length, of the selected range of diaphragm opening, and of the selected low-dispersion and high-dispersion glasses at the command of the optical workman.

One preferred species of the lens is shown in Fig. 11. By appropriate selection of glass for the lenses and division of the refractive elements into several properly figured and spaced parts made of glass of the same refractive properties, the desired focussing and aberrations of the images may also be obtained in the desired quantitative relationship. It should be borne in mind that a large chromatic aberration is desired, and that Dolland's device of an achromatic couple of different dispersions and a combined deflecting power is unnecessary, provided that the deflections of incident light by the lens can be arranged to reproduce that degree of convergence of the incident light corresponding to the monocular image of the human eye above discussed and quantitatively tabulated. A satisfactory instance is shown in Fig. 11, comprising four components $L^{10}$, $L^{11}$, $L^{12}$, $L^{13}$, of which the inner pair are negative and the outer pair of double convex figure.

When these are made of a suitable glass, such as Paramantois barium flint known as M8651, having indices of refraction for different wave-lengths as follows:

$$N_C = 1.60133$$
$$N_D = 1.60534$$
$$N_F = 1.61520$$
$$N_G = 1.62348$$

with a comparative dispersion $$n = 43.6$$

the following constants, referring to the numbered surfaces of Fig. 11, and the thicknesses and spaces therein indicated, apply to the selected instance as follows:

Radii:
$$R_1 = 12.1596$$
$$R_2 = -28.7129$$
Central thickness $t^1 = 1.3000$
Spacing $S^1 = 0.1560$
$$R_3 = 18.1524$$
$$R_4 = 15.3546$$
Central thickness $t^2 = 0.5200$
Spacing $S^2 = 1.4560$
$$R_5 = -25.7238$$
$$R_6 = 14.1673$$
Central thickness $t^3 = 0.5200$
Spacing $S^3 = 2.9224$
$$R_7 = 28.7129$$
$$R_8 = -12.1596$$
Central thickness $t^4 = 1.3000$ A lens so constructed has the functional quantitative effects in respect to the aberrations of the image above tabulated.

I am not to be understood as limiting my invention, however, to any particular concatenation of refractive lenses, since it is obvious that the effect identifying the lens system as that new association of refractive instruments of which it consists may be obtained by many other expedients of the optician. For example, one useful arrangement of elements ensues when some of the components are made of glass having the same index of refraction for light of the wave-length of the sodium D line as all the other components, but differ from the others in dispersive power. Thus, one of the described components in the form of Fig. 11 might be figured from Schott Jena crown-glass of that maker's melt No. 0.3712, with no other effect than varying the quantitative degree of the chromatic aberration of the whole system.

The form of the lens shown in Fig. 11 as well as that shown in Fig. 10 is in practice provided with a changeable diaphragm for controlling its effective aperture.

Photographs produced by the exposure of a sensitive plate in the image-plane of the above described lens system portray the object field with the characteristic diffusions due to the optical aberrations and distortions above explained and therefore have the characteristic property of correct monocular illusion of depth, as well as of concentration at the center of interest of such parts of the picture as are to be seen in acute definition. Such photographs, as described and claimed in my application Serial No. 351,011, filed Jan. 12, 1920, of which this application is a division are a characteristic product of the new lens system.

I claim:—

1. A lens system having refractive elements having surfaces formed and assembled to cause on a surface an image of an object field having therein different kinds of diffusion of the images of objects displaced from the object focused axially, which diffusions are substantially and respectively similar to the corresponding different kinds of diffusions of the image of objects similarly displaced formed on the retina of the human eye.

2. A lens system having refractive elements having surfaces formed and assembled to form on a surface an image of an object field having therein distortions of the images of objects displaced from the object focused axially, the distortions being substantially similar to the corresponding different kinds of distortions of the image formed on the retina of the human eye.

3. A lens system having refractive elements having surfaces formed and assembled to cause on a plane surface an image of an object field having therein different kinds of diffusions of the images of objects displaced from the object focused axially, the diffusions being substantially similar to the corresponding different kinds of diffusions of the image of objects similarly displaced formed on the retina of the human eye.

4. A lens system having refractive elements having surfaces formed and assembled to cause on a plane surface an image of an object field having therein diffusions and distortions of images of objects displaced from the object focused axially, and which are substantially similar to the corresponding diffusions and distortions of the images of objects similarly displaced formed on the retina of the human eye.

5. A lens system having refractive elements having differently formed surfaces assembled to have an effective aperture related to focal length to form on a surface an image of an object field having therein respectively axial depth of focus and diffusions of the axial image due to chromatic aberration substantially similar to the corresponding axial depth of focus and diffusion due to chromatic aberration characteristic of the image formed on the retina of the normal human eye.

6. A lens system having substantially the same aperture relative to focal length as the normal human eye and thereby adapted to form on a plane surface an image of an object field having therein substantially the same axial depth of focus as the eye, said lens system having refractive elements adapted to produce in the image on said surface astigmatic aberrations substantially the same as the corresponding aberrations of the image formed on the retina of the normal human eye.

7. A lens system for photography having therein component refractive lenses severally shaped and positioned mutually to produce an image having linear distortions and having diffusions due to chromatic aberration substantially similar respectively to those of the image on the retina of the normal human eye.

8. A lens system for photography having substantially the same aperture relative to focal length as the human eye and thereby adapted to form images of substantially the same axial depth of focus as the eye and having therein lenses of different refractive power severally shaped and positioned mutually to produce an image on a flat image plane having linear distortions and having diffusions due to chromatic aberration substantially similar respectively to those of the image on the retina of the normal human eye.

9. A lens system for photography having substantially the same aperture relative to focal length as the human eye and thereby adapted to form images of substantially the same axial depth of focus as the eye, and having therein refractive lenses severally shaped and positioned mutually to produce an image having linear distortion substantially corresponding to the distortion of the retinal image.

10. A lens system for photography having substantially the same aperture relative to focal length as the human eye and thereby adapted to form images of substantially the same axial depth of focus as the eye, and having therein lenses severally shaped and positioned mutually to produce an image having therein diffusion due to radial and tangential astigmatism substantially corresponding to the similar diffusions of the retinal image.

11. A lens system for photography characterized by lenses of different refractive power severally of suitable geometrical form, thickness and separation mutually to correct in part the refractive effect of spherical surfaces, and refractively providing for an image having diffusions due to aberrations substantially of the same kind as the diffusions of the image on the retina of the human eye.

12. A lens system for photography characterized by lenses of like density and of curvatures mutually arranged for the refractive introduction of chromatic aberration, whereby to form on a plane image surface an image having chromatic aberrations substantially similar in character, direction and quantity to the chromatic aberration of the image in the human eye.

13. A lens system for photography characterized by lenses of curvatures mutually arranged for the refractive correction for monochromatic light of spherical aberration in respect to a plane image surface, and also mutually arranged for refractive introduction of chromatic aberration to a degree substantially corresponding to and not exceeding the chromatic aberration of the normal human eye.

14. A lens system comprising means for forming on a surface an image of an object field having therein astigmatic diffusions substantially similar to the corresponding astigmatic diffusions of the image formed on the retina of the normal human eye.

15. A lens system comprising means for forming on a surface an image of an object field having therein astigmatic diffusions substantially similar to the corresponding astigmatic diffusions of the image formed on the retina of the normal human eye, the lens comprising means for creating in the image chromatic aberrations substantially similar to those of the retinal image.

16. A lens system comprising means for forming on a plane surface an image of an object field having therein astigmatic diffusions at different angles from the axis of the lens substantially similar to the corresponding astigmatic diffusions of the image formed on the retina of the normal human eye.

17. A lens system comprising means for forming on a plane surface an image of an object field having therein astigmatic diffusions at different angles from the axis of the lens substantially similar to the corresponding astigmatic diffusions of the image formed on the retina of the normal human eye, said system having elements adapted to produce an image characterized by both chromatic aberrations and linear distortion.

18. A lens system for photography characterized by lenses of appropriate density severally shaped and positioned mutually figured partially to correct the astigmatic aberrations of the system, the corrections providing for an image having tangential and radial astigmatic diffusion due to uncorrected aberrations substantially of the same degree and lying in the same direction as the similar diffusions of the image on the retina of the normal human eye.

19. A lens system comprising means for forming on a surface an image of an object field having therein astigmatic diffusions substantially similar to the corresponding astigmatic diffusions of the image formed on the retina of the normal human eye, and means for distorting the image in a linear sense corresponding to the distortion of the retinal image.

20. A lens system for photography characterized by lenses of like density and of curvatures mutually arranged for the refractive correction in part only of astigmatic diffusion of images of objects lying in an angle to the optical axis, whereby to form on a plane image surface images having astigmatic aberrations substantially similar in character, direction and quantity to the astigmatic aberrations of the image in the normal human eye.

21. A lens system for forming on a plane surface an image of an object field characterized by lenses having surfaces mutually arranged for the refractive rectilinear distortion of the image to a degree substantially corresponding to the rectilinear distortion of the image on the curved retinal surface of the normal human eye.

22. A lens system for photography characterized by lenses of curvatures mutually arranged for the refractive correction in part only of chromatic aberration in respect to a plane image surface, and also mutually arranged for the refractive rectilinear distortion of the image to a degree substantially corresponding to the distortion of the normal human eye.

23. A lens system having therein refractive components of appropriate precalculated density and curvature, thickness and mutual position to form on a surface an image of an object field, the image having therein chromatic diffsions and astigmatic diffusions of parts of the image at angular distances from the optical axis substantially similar to the said diffusions of the image formed on the retina of the normal human eye at like angular distances.

24. A lens system having refractive elements and a variable diaphragm for forming on a plane surface an image of an object-field, the image having therein diffusions substantially similar to the corresponding diffusions of the image formed on the restina of the normal human eye, the relations of the elements being such as to cause the character and extent of the diffusions to vary with the variable aperture in the same direction and substantially to the same degree as occasioned by the variation of pupillary aperture in the eye.

25. A lens system for photography comprising components mutually producing images in which the primary and secondary astigmatic fields lie near a plane perpendicular to the axis of the lens, the primary field lying nearer the lens than the secondary field.

26. A lens system for photography comprising components mutually producing images in which the primary and secondary astigmatic fields lie near a plane perpendicular to the axis of the lens, the primary field lying nearer the lens than the secondary field, the separation between said fields being substantial in proportion to the focal distance.

27. A lens system for photography comprising components mutually producing images in which the primary and secondary astigmatic fields lie near a plane perpendicular to the axis of the lens, the primary field lying nearer the lens than the secondary field, the separation between said field being, in proportion to the focal distance, substantially that characteristic of the human eye.

28. A lens system for photography comprising components mutually producing images in which there are chromatic aberrations of the degree characteristic of the human eye and in which the primary and secondary astigmatic fields lie near a plane perpendicular to the axis of the lens, the primary field lying nearer the lens than the secondary field.

29. A lens system for photography comprising components mutually producing images in which the primary and secondary astigmatic fields lie near a plane perpendicular to the axis of the lens, the primary field lying nearer the lens than the secondary lens, the refraction of the lens varying at angles from the optical axis to produce linear distortion by the variable deflection of images at different degrees of departure from the axis.

Signed by me at Hanover, New Hampshire this 27th day of May, 1921.

ADELBERT AMES, Jr.